United States Patent [19]

Horino et al.

[11] Patent Number: 5,427,302
[45] Date of Patent: Jun. 27, 1995

[54] METHOD OF BONDING AND METALLIZING FOR LIGHT POLARIZERS

[75] Inventors: Hiroyuki Horino; Toshiyuki Masuda; Tadatoshi Hosokawa, all of Saitama, Japan

[73] Assignee: Chichibu Cement Co., Ltd., Japan

[21] Appl. No.: 209,438

[22] Filed: Mar. 10, 1994

[30] Foreign Application Priority Data

Mar. 15, 1993 [JP] Japan .................................. 5-080082

[51] Int. Cl.$^6$ ............................................. B23K 31/02
[52] U.S. Cl. .................... 228/122.1; 228/190; 228/208
[58] Field of Search ...................... 228/122.1, 190, 208; 427/376.7, 383.7; 264/1.34

[56] References Cited

U.S. PATENT DOCUMENTS

| | | | |
|---|---|---|---|
| 3,787,958 | 1/1974 | Freedman et al. | 228/122.1 |
| 4,995,546 | 2/1991 | Regnault | 228/190 |
| 5,305,137 | 4/1994 | Ohkawara | 359/484 |

*Primary Examiner*—P. Austin Bradley
*Assistant Examiner*—Jeffrey T. Knapp
*Attorney, Agent, or Firm*—Zarley, McKee, Thomte, Voorhes, & Sease

[57] ABSTRACT

A method of bonding a light polarizer having a metal sheet 4, 4-1 affixed to an end face thereof to a securing metal layer 5 involves bonding the securing metal layer 6 to the metal sheet 4, 4-1 by means of welding, whereby not only the working efficiency may be enhanced, but also long-term reliability in bonding may be ensured.

4 Claims, 2 Drawing Sheets

METHOD OF BONDING AND METALLIZING FOR LIGHT POLARIZERS

FIELD OF THE INVENTION

The present invention relates to a method of bonding and metallizing for light polarizers to be used for various types of optical equipment and laser/optical components.

BACKGROUND ART

Light polarizers comprising a plurality of elements are known. It was heretofore a common practice to bond such elements together using epoxy adhesives, low-melting glass, or the like. Metallizing of a polarizer was effected directly on the workpiece.

The use of epoxy adhesives is apt to cause drifting in position between the bonded components, resulting in a lack of long-term reliability in bonding strength and hence structural integrity, because such adhesives tend to soften at an elevated temperature. On the other hand, the problem with low-melting glass is that it is required to heat up and cool down the glass gradually, resulting in reduced working efficiency.

SUMMARY OF THE INVENTION

The present invention is directed to overcoming the above mentioned problems. Accordingly, an object of the invention is to provide a method of bonding and metallizing for light polarizers, which permits the provision of polarizers having improved long-term reliability in bonding strength, in addition to enhancement of the working efficiency.

According to one aspect of the present invention as described in the appended claim 1, there is provided a method of bonding for a light polarizer, involving the step of bonding the polarizer having metal sheet means affixed to an end face thereto to a securing metal means, characterized in that said step comprises effecting the bonding between the securing metal means and the metal sheet means affixed to the polarizer by means of welding.

In the method of claim 1, the polarizer and the metal sheet means may be bonded together with ceramic sheet means interposed therebetween, as set forth in claim 2.

In the method of claim 2, the bonding surfaces of the polarizer, the metal sheet means and the ceramic sheet means may comprise metallized layers, as set forth in claim 3.

In the method of claim 3, the bonding between the polarizer and the ceramic sheet means and the bonding between the ceramic sheet and the metal sheet means are effected by means of soldering, as set forth in claim 4.

It has been found that according to the method of claim 1, the bonding by the use of welding provides for an enhanced bond strength between the securing metal means and the metal sheet means affixed to the polarizer and permits the bonding time to be shortened.

The interposition of ceramic sheet means between the polarizer and the metal sheet means, as set forth in claim 2 allows for differences in thermal expansion between the polarizer and the metal sheet means to be taken up. The ceramic sheet means thus acts as a buffer member. Ceramic materials suitable for use to this end may include alumina, zirconia, glass and the like. But for such ceramic sheet means, the polarizer can be subject to strains and/or cracks.

The bonding surfaces of the polarizer, the metal sheet means and the ceramic sheet means which are formed of metallized layers, as set forth in claim 3 permit the use of soldering technique to bond those surfaces together. Such metallized layers may be formed by well known sputtering, vapor deposition or metal plating process.

According to the method of claim 4, it is to be understood that polarizers which have high resistance to temperature and humidity changes and hence long-term reliability in structural integrity and performance may be produced since the polarizer, the ceramic sheet means and the metal sheet means are bonded together by means of soldering which is capable of high bonding strength.

BRIEF DESCRIPTION OF THE DRAWINGS

The foregoing summary, as well as the following detailed description, will be better understood when read in conjunction with the appended drawings, in which.

DESCRIPTION OF THE EMBODIMENTS

Figure 1:
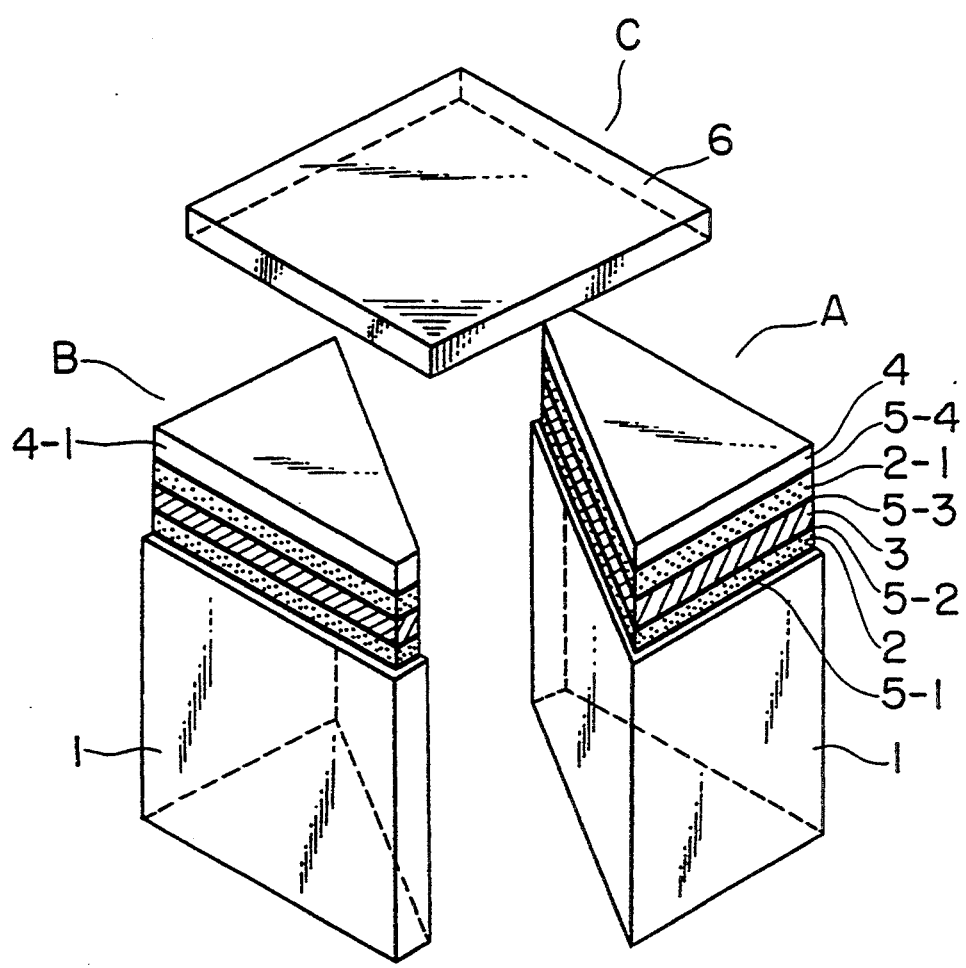
FIG. 1 is a schematic exploded perspective, partly in cross-section, view of a polarizer, illustrating the bonding process for the polarizer according to the present invention.
Figure 2:
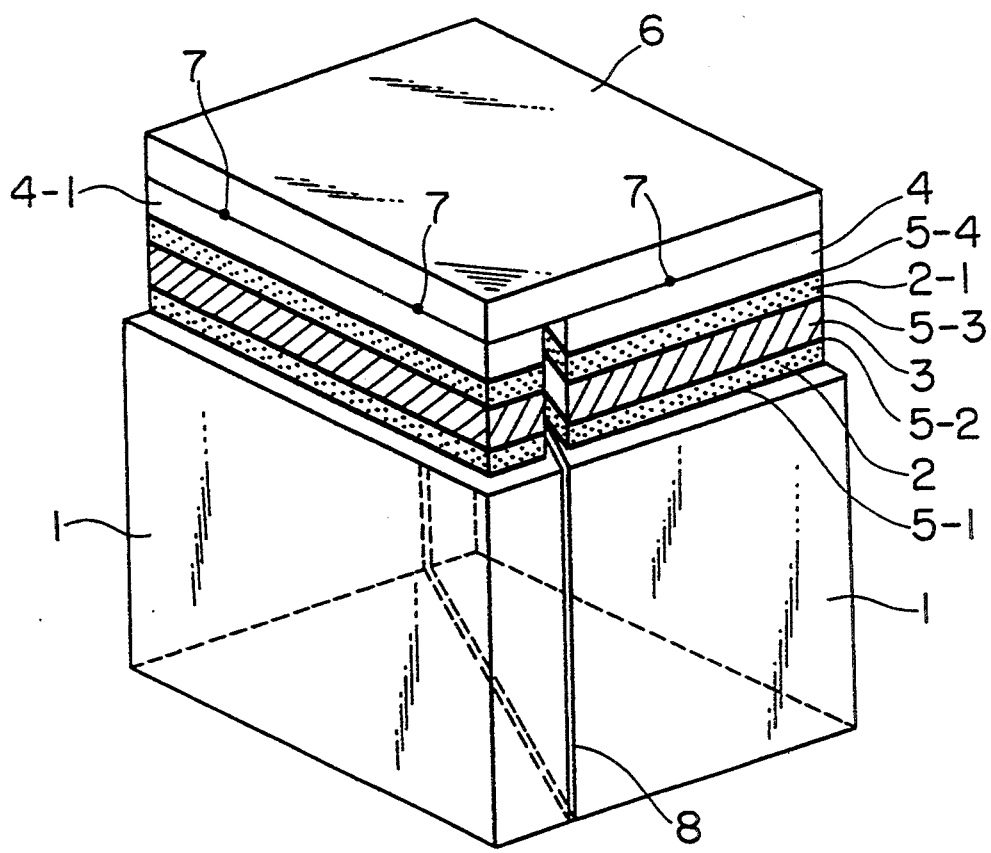
FIG. 2 is a view similar to that of FIG. 1 but illustrates the polarizer in its assembled condition.

Referring to the drawings, FIG. 1 illustrates an embodiment of the bonding process according to the present invention to assemble a light polarizer comprising a Glan-Taylor prism which is shown in an exploded perspective, partly in cross-section, view. FIG. 2 shows the polarizer in its assembled condition in a perspective view.

In FIGS. 1 and 2, the polarizer is shown as comprising two prism elements "A" and "B" secured together in a unitary unit by a securing means "C". Specifically, each of the prism elements "A" and "B" comprises a rutile prism 1, and a solder layer 2, a ceramic layer 3, a solder layer 2-1 and a metal sheet 4 or 4-1 laminated successively in the order named on the prism 1.

The metal sheet 4 or 4-1 may be a stainless steel sheet which is SUS 304 in the illustrated embodiment. A metallized layer 5-1 is applied to the top surface of the rutile prism, and metallized layers 5-2 and 5-3 are deposited on the bottom and top surfaces, respectively of the ceramic layer 3. Further, a metallized layer 5-4 is applied to the bottom surface of the stainless steel sheet 4 or 4-1. The ceramic layer 3 may comprise an alumina sheet.

The securing means "C" may comprise a metal sheet such as stainless steel sheet 6 which is also SUS 304 in the illustrated embodiment. The stainless steel sheet 6 may have a thickness of 0.3 mm, and the stainless steel sheets 4 and 4-1 each may be 0.5 mm thick. The alumina sheet 3 may be 0.5 mm thick. The securing metal sheet 6 and the metal sheets 4 and 4-1 of the prism elements "A" and "B", respectively are secured together by weld joints 7.

The metallized layers 5-1, 5-2, 5-3 and 5-4 may preferably be formed by sputtering metal such as gold onto the top bonding surface of the rutile prism 1, the bottom and top surfaces of the alumina sheet (ceramic layer) 3, and the bottom surface of the stainless steel sheet 4 or 4-1, respectively. Particularly for the bonding surface of the rutile prism 1, silicon dioxide and titanium are preferably sputtered successively in the order named onto the surface of the rutile prism 1 as an undercoat for the gold-metallized layer. That is, the bonding surface of the rutile prism 1 may comprise silicon dioxide, titanium and gold sputtered successively in the order named on the top surface of the rutile prism 1.

The bonding between the rutile single crystal 1 and the alumina sheet 3 and the bonding between the alumina sheet 3 and the stainless sheet 4 are effected preferably by means of solders such as Au-Su solders 2 and 2-1, respectively to form rutile prism elements "A" and "B".

Two rutile prism elements "A" and "B" are then combined so as to obtain desired optical properties. The respective stainless steel sheets 4 and 4-1 of the two rutile prism elements "A" and "B" are temporarily joined to the securing stainless steel sheet 6 by adhesives, followed by bonding the stainless steel sheets 4 and 4-1 to the securing stainless steel sheet 6 by welds 7 to complete the assembly of a polarizing rutile prism, as shown in FIG. 2.

It has been found that the thus assembled polarizing prism is highly resistant to temperature and humidity changes. After being subjected to hundred cycle tests at $=20°$ C. to $100°$ C., the polarizing prism assembled according to the process of the present invention was found to maintain a bonding strength equal to or greater than 100 $Kg/cm^2$ an extinction ratio equal or higher than 50dB, exhibiting an excellent long-term reliability in bonding strength and hence structural integrity without significant variation of optical properties over time.

As described hereinabove, it is to be appreciated that the present invention provides a method of bonding a polarizer having metal sheet means affixed to an end face thereof to a securing metal means, which permits the provision of polarizers having improved long-term reliability in structural integrity, in addition to the enhancement of the working efficiency.

While specific embodiments of the invention have shown and described in detail to illustrate the application of the principles of the invention, it will be understood that the invention may be embodied otherwise without departing from the spirit and scope of the invention.

We claim:

1. A method of bonding a light polarizer to a securing metal means wherein said the polarizer has a metal sheet means affixed to an end face thereof comprising bonding said securing metal means to said metal sheet means by means of welding.

2. The method of claim 1 wherein, said polarizer and said metal sheet means are bonded together with ceramic sheet means interposed therebetween.

3. The method of claim 2 wherein, the bonding surfaces of said polarizer, said metal sheet means and said ceramic sheet means are formed of metallized layers.

4. The method of claim 3 wherein, the bonding between said polarizer and said ceramic sheet means the bonding between said ceramic sheet and said metal sheet means are effected by means of soldering.

* * * * *